US012803751B2

(12) United States Patent
Al-Eryani et al.

(10) Patent No.: US 12,803,751 B2
(45) Date of Patent: Nov. 17, 2026

(54) COMBINED REFERENCE SIGNAL DESIGN FOR ENHANCED UPLINK CHANNEL STATE ESTIMATION

(71) Applicant: Dell Products L.P., Round Rock, TX (US)

(72) Inventors: Yasser Al-Eryani, Kanata (CA); Ravi Sharma, Cupertino, CA (US); Vikas Arora, Ottawa (CA)

(73) Assignee: DELL PRODUCTS L.P., Round Rock, TX (US)

( * ) Notice: Subject to any disclaimer, the term of this patent is extended or adjusted under 35 U.S.C. 154(b) by 265 days.

(21) Appl. No.: 18/813,678

(22) Filed: Aug. 23, 2024

(65) Prior Publication Data

US 2026/0058774 A1 Feb. 26, 2026

(51) Int. Cl.
*H04L 5/00* (2006.01)
*H04L 27/26* (2006.01)

(52) U.S. Cl.
CPC ........ *H04L 5/0051* (2013.01); *H04L 27/2613* (2013.01)

(58) Field of Classification Search
CPC ... H04L 5/0048; H04L 5/0051; H04L 5/0091; H04L 25/0226; H04L 27/261; H04L 27/2613; H04W 72/21
USPC ........................................ 370/252, 329, 335
See application file for complete search history.

(56) References Cited

U.S. PATENT DOCUMENTS

2012/0106373 A1* 5/2012 Gaal .................... H04L 5/0048 370/252
2015/0327244 A1* 11/2015 Pajukoski ............ H04L 5/0048 370/335

* cited by examiner

*Primary Examiner* — Harun Chowdhury
(74) *Attorney, Agent, or Firm* — Amin, Turocy & Watson, LLP

(57) ABSTRACT

A method facilitating efficient resource grants for radio resource control (RRC) messaging includes generating, by centralized unit equipment including at least one processor, scheduling instructions for an RRC message, including embedding a resource grant request, for uplink communication resources to be allocated for an uplink message to be transmitted by a user equipment in response to the RRC message, into the scheduling instructions; generating, by the centralized unit equipment, a downlink F1 application protocol (F1AP) message including the RRC message and the scheduling instructions; and transmitting, by the centralized unit equipment, the downlink F1AP message to distributed unit equipment serving the user equipment.

20 Claims, 13 Drawing Sheets

300

$$S_i = \left\{ \begin{bmatrix} +\sqrt{0.5} \\ +\sqrt{0.5} \end{bmatrix}, \begin{bmatrix} -\sqrt{0.5} \\ +\sqrt{0.5} \end{bmatrix} \right\}, \quad S_j = \left\{ \begin{bmatrix} +\sqrt{0.5} \\ +\sqrt{0.5} \end{bmatrix}, \begin{bmatrix} -\sqrt{0.5} \\ +\sqrt{0.5} \end{bmatrix} \right\}$$

$$S_{Con.} = \left\{ \begin{bmatrix} +\sqrt{0.5} \\ +\sqrt{0.5} \\ +\sqrt{0.5} \\ +\sqrt{0.5} \end{bmatrix}, \begin{bmatrix} -\sqrt{0.5} \\ +\sqrt{0.5} \\ +\sqrt{0.5} \\ +\sqrt{0.5} \end{bmatrix}, \begin{bmatrix} +\sqrt{0.5} \\ +\sqrt{0.5} \\ +\sqrt{0.5} \\ +\sqrt{0.5} \end{bmatrix}, \begin{bmatrix} -\sqrt{0.5} \\ +\sqrt{0.5} \\ +\sqrt{0.5} \\ +\sqrt{0.5} \end{bmatrix}, \begin{bmatrix} +\sqrt{0.5} \\ +\sqrt{0.5} \\ -\sqrt{0.5} \\ +\sqrt{0.5} \end{bmatrix}, \begin{bmatrix} -\sqrt{0.5} \\ +\sqrt{0.5} \\ -\sqrt{0.5} \\ +\sqrt{0.5} \end{bmatrix}, \begin{bmatrix} +\sqrt{0.5} \\ +\sqrt{0.5} \\ -\sqrt{0.5} \\ +\sqrt{0.5} \end{bmatrix}, \begin{bmatrix} -\sqrt{0.5} \\ +\sqrt{0.5} \\ -\sqrt{0.5} \\ +\sqrt{0.5} \end{bmatrix} \right\}$$

302

$$S_i = \left\{ \begin{bmatrix} -\sqrt{0.5} \\ -\sqrt{0.5} \end{bmatrix}, \begin{bmatrix} -\sqrt{0.5} \\ +\sqrt{0.5} \end{bmatrix} \right\}, \quad S_j = \left\{ \begin{bmatrix} +\sqrt{0.5} \\ +\sqrt{0.5} \end{bmatrix}, \begin{bmatrix} -\sqrt{0.5} \\ +\sqrt{0.5} \end{bmatrix} \right\}$$

$$S_{Con.} = \left\{ \begin{bmatrix} +\sqrt{0.5} \\ +\sqrt{0.5} \\ -\sqrt{0.5} \\ -\sqrt{0.5} \end{bmatrix}, \begin{bmatrix} -\sqrt{0.5} \\ +\sqrt{0.5} \\ -\sqrt{0.5} \\ -\sqrt{0.5} \end{bmatrix}, \begin{bmatrix} -\sqrt{0.5} \\ -\sqrt{0.5} \\ +\sqrt{0.5} \\ +\sqrt{0.5} \end{bmatrix}, \begin{bmatrix} -\sqrt{0.5} \\ +\sqrt{0.5} \\ +\sqrt{0.5} \\ +\sqrt{0.5} \end{bmatrix}, \begin{bmatrix} +\sqrt{0.5} \\ +\sqrt{0.5} \\ -\sqrt{0.5} \\ +\sqrt{0.5} \end{bmatrix}, \begin{bmatrix} -\sqrt{0.5} \\ +\sqrt{0.5} \\ -\sqrt{0.5} \\ +\sqrt{0.5} \end{bmatrix}, \begin{bmatrix} -\sqrt{0.5} \\ -\sqrt{0.5} \\ -\sqrt{0.5} \\ +\sqrt{0.5} \end{bmatrix}, \begin{bmatrix} -\sqrt{0.5} \\ +\sqrt{0.5} \\ -\sqrt{0.5} \\ +\sqrt{0.5} \end{bmatrix} \right\}$$

$$G_{orth.} = \left\{ \begin{bmatrix} -\sqrt{0.5} \\ +\sqrt{0.5} \\ -\sqrt{0.5} \\ -\sqrt{0.5} \end{bmatrix}, \begin{bmatrix} -\sqrt{0.5} \\ +\sqrt{0.5} \\ +\sqrt{0.5} \\ +\sqrt{0.5} \end{bmatrix}, \begin{bmatrix} +\sqrt{0.5} \\ +\sqrt{0.5} \\ -\sqrt{0.5} \\ +\sqrt{0.5} \end{bmatrix}, \begin{bmatrix} -\sqrt{0.5} \\ -\sqrt{0.5} \\ -\sqrt{0.5} \\ +\sqrt{0.5} \end{bmatrix} \right\}$$

FIG. 3

COMBINED REFERENCE SIGNAL DESIGN FOR ENHANCED UPLINK CHANNEL STATE ESTIMATION

BACKGROUND

The proliferation of massive machine-type communications (mMTC) in massive multiple-input multiple-output (mMIMO) networks has introduced unprecedented demands on spectral efficiency and pilot signal orthogonality. In this context, mMTC refers to the connectivity of a vast number of machines or devices that communicate with little human intervention, typically characterized by small data packets and sporadic transmissions. Additionally, mMIMO is a communication technology characterized by the use of a large number of antennas at base stations to serve many user devices simultaneously, resulting in substantial improvements in spectral and energy efficiency over traditional MIMO systems.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include at least one processor and at least one memory that stores executable instructions that, when executed by the at least one processor, facilitate performance of operations. The operations can include concatenating respective first vectors of mutually orthonormal sounding reference signal (SRS) pilot sequences with respective second vectors of mutually orthonormal demodulation reference signal (DMRS) pilot sequences, resulting in a group of concatenated vectors of pilot sequences. The operations can additionally include estimating an uplink channel state associated with a communication network in which the system operates using a selected concatenated vector of the group of concatenated vectors of pilot sequences, the selected concatenated vector being selected as a result of determining that the selected concatenated vector comprises a number of mutually orthogonal pilot sequences that is greater than a threshold number.

In another implementation, a method is described herein. The method can include concatenating, by network equipment including at least one processor, respective first sets of mutually orthonormal SRS pilot sequences with respective second sets of mutually orthonormal DMRS pilot sequences, resulting in a group of concatenated sets of pilot sequences. The method can also include estimating, by the network equipment, an uplink channel state associated with a communication network in which the network equipment operates using a selected concatenated set of the group of concatenated sets of pilot sequences, where the selected concatenated set is selected as a result of determining that the selected concatenated set includes a number of mutually orthogonal pilot sequences that is greater than a threshold number.

In an additional implementation, a non-transitory machine-readable medium is described herein that can include instructions that, when executed by at least one processor, facilitate performance of operations. The operations can include combining respective first vectors of mutually orthonormal SRS pilot sequences with respective second vectors of mutually orthonormal DMRS pilot sequences, resulting in a group of combined vectors of pilot sequences; and estimating an uplink channel state associated with a communication network associated with the network equipment using a selected combined vector, the selected combined vector being selected from the group of combined vectors of pilot sequences as a result of determining that the selected combined vector comprises a number of mutually orthogonal pilot sequences that is greater than a threshold number.

DESCRIPTION OF DRAWINGS

Various non-limiting embodiments of the subject disclosure are described with reference to the following figures, wherein like reference numerals refer to like parts throughout unless otherwise specified.

FIG. 3 is a diagram illustrating example pilot signal sets that can be generated in various implementations described herein.

DETAILED DESCRIPTION

Figure 1:
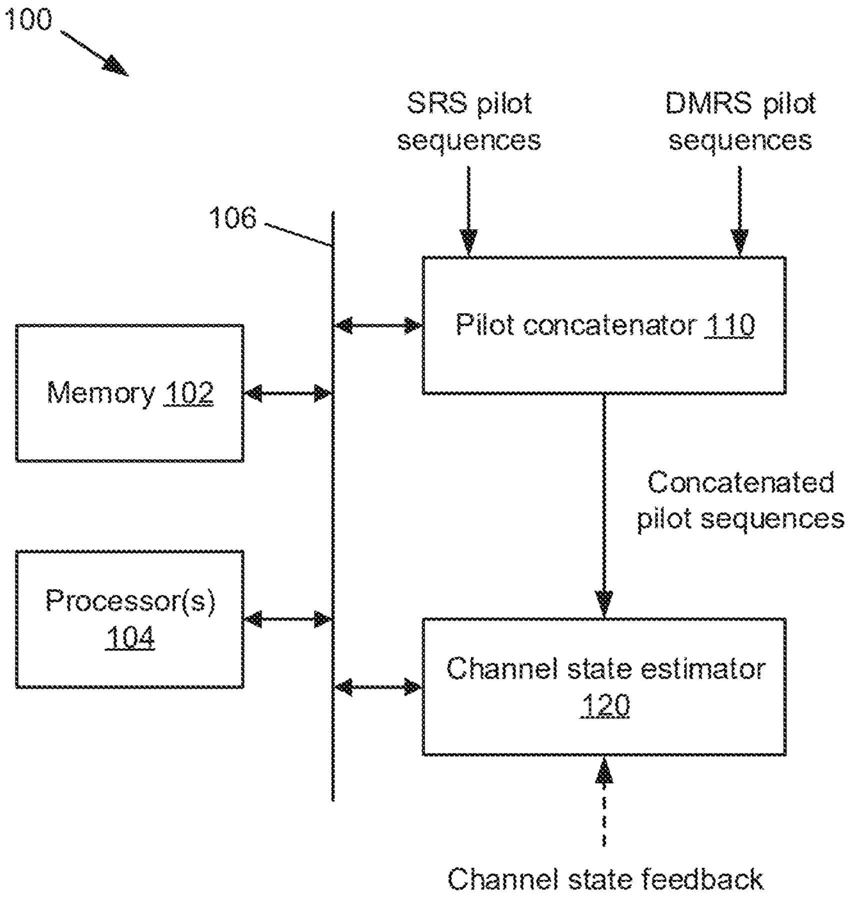
FIGS. 1-2 are block diagrams of respective systems that facilitate combined reference signal design for enhanced uplink channel state estimation in accordance with various implementations described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Various implementations described herein relate to increasing uplink pilot orthogonality in wireless communication networks, such as networks employing massive machine-type communications (mMTC) and massive multiple-input multiple-output (mMIMO), through joint design of pilot signals, e.g., sounding reference signal (SRS) and demodulation reference signal (DMRS) pilots. As noted above, the proliferation of mMTC in mMIMO networks has introduced new challenges in network design. One of these challenges is the mitigation of pilot contamination, which can compromise channel estimation quality and overall system performance. Pilot contamination arises in mMIMO systems when non-orthogonal pilot signals from different devices interfere with each other, leading to erroneous channel estimation. This phenomenon becomes more pronounced as the number of UEs increases, which is a common trend in the rapidly expanding mMTC landscape. Effective channel estimation is desirable to facilitate coherent detection and precoding, which can have a significant impact on the performance of mMIMO networks.

To the furtherance of the above and/or related ends, described herein are implementations that address the challenges of mMTC and mMIMO networks through the joint design of DMRS and SRS for uplink (UL) transmission, e.g., to enhance the orthogonality of pilot signals. As will be described herein, channel state information (CSI) estimation can be performed at a gNodeB (gNB) by using the concatenation of jointly designed SRS and DMRS signals. By doing so, a rigorous signal processing framework can be leveraged for the joint generation of SRS and DMRS sequences that yields an orthonormal combined signal structure. This framework can significantly increase the dimensionality of the pilot signals, thereby creating a more robust system capable of accommodating a larger pool of user equipment (UEs) while concurrently mitigating pilot contamination. Additionally, techniques are described herein that enable optimization of the joint sequence design while ensuring that the integration of SRS and DMRS maintains their individual signal characteristics, which is desirable for effective channel estimation and network sounding.

Implementations described herein provide an improved approach to signal design in mMIMO networks, e.g., mMIMO networks employing mMTC. More particularly, techniques described herein can be used to overcome the challenges of pilot signal management, significantly enhancing network performance and capacity. By utilizing a joint generation method for DMRS and SRS, an orthonormal combined signal can be created that can increase system dimensionality and accommodate a larger number of UEs without exacerbating pilot contamination. As described below, this can be achieved through a sophisticated algorithm that ensures the orthonormality of the combined (concatenated) pilot signals, thereby optimizing the use of the available spatial channels within the mMIMO system.

While some implementations are described herein with reference to communication networks that utilize mMIMO and/or mMTC, it is noted that the techniques described herein are not intended to be limited to any particular network implementations or technologies. For instance, the techniques described herein could be utilized in any network employing pilot signals, including networks that do not utilize mMIMO or mMTC. It is further noted that any references to particular network technologies and/or techniques in this description are made merely for purposes of illustration and are not intended to limit the scope of this description or the claimed subject matter unless explicitly stated otherwise.

With reference to the drawings, FIG. 1 illustrates a block diagram of a system 100 that facilitates combined reference signal design for enhanced UL channel state estimation in accordance with various implementations described herein. System 100 as shown in FIG. 1 includes executable components, e.g., a pilot concatenator 110 and a channel state estimator 120, each of which can operate as described in further detail below. In an implementation, the components 110, 120 of system 100 can be implemented in hardware, software, or a combination of hardware and software. By way of example, the components 110, 120 can be stored on at least one memory (e.g., a memory 102) and executed by at least one processor (e.g., processor(s) 104). An example of a computer architecture including a processor and memory that can be used to implement the components 110, 120, as well as other components as will be described herein, is shown and described in further detail below with respect to FIG. 13. As further shown in FIG. 1, the executable components 110, 120, the memory 102, the processor 104, and/or other elements of system 100 can communicate with each other via a bus 106 and/or other components that provide intercommunication between various elements of system 100.

Additionally, it is noted that the functionality of the respective components shown and described herein can be implemented via a single device and/or a combination of devices, such as one or more devices associated with a gNB and/or other suitable elements of a communication network. For instance, in various implementations, the pilot concatenator 110 shown in FIG. 1 could be implemented via a first device, and the channel state estimator 120 could be implemented via the first device or a second device. Also, or alternatively, the functionality of a single component could be divided among multiple devices in some implementations.

With reference now to the components of system 100, the pilot concatenator 110 can concatenate multiple sets of mutually orthonormal pilot sequences, such as respective first vectors (sets) of mutually orthonormal SRS pilot sequences and respective second vectors (sets) of mutually orthonormal DMRS pilot sequences, resulting in a group of concatenated vectors (sets) of pilot sequences. Based on these concatenated pilot sequences, the channel state estimator 120 can estimate an uplink channel state associated with a communication network in which system 100 operates using a selected concatenated vector of the group of concatenated vectors of pilot sequences generated by the pilot concatenator 110.

In an implementation, the channel state estimator 120 can designate a selected concatenated vector as a result of determining that the selected concatenated vector contains a number of mutually orthogonal pilot sequences that is greater than a threshold number. As will be described in further detail below, this threshold number can be a relative threshold, e.g., relative to a maximum number of mutually orthogonal pilot sequences present in any given vector of the concatenated vectors of pilot sequences, and/or an absolute threshold, e.g., relative to a sum of the respective dimensionalities of the SRS and DMRS pilot sequences as supported by the network in which system 100 operates.

As shown in FIG. 1, the channel state estimator 120 can estimate UL channel state information (CSI) associated with a communication channel between system 100 and one or more UEs or other devices based on DMRS and/or SRS pilot signals, which are utilized as components in the uplink transmission of mMIMO systems. For instance, DMRS can be utilized for the demodulation of data, while SRS can be employed for measuring channel quality. However, conventional approaches for generating these signals independently (e.g., during the design process at the gNB) does not scale well with the number of UEs, which can lead to pilot contamination.

In an implementation, system 100, e.g., via the pilot concatenator 110, can utilize an integrated signal design that enhances the orthogonality of pilot signals. This increased orthogonality can improve accuracy of CSI acquisition, which can in turn improve the performance of an underlying mMIMO system. For instance, the pilot concatenator 110 can leverage an orthonormal basis for combined DMRS and SRS signals, e.g., as will be described in further detail below with respect to FIG. 4. As used herein, orthonormality refers to a mathematical condition that ensures minimal interference between signals, which is desirable for maintaining the purity of pilot signals in a congested network. Additionally, the channel state estimator 120 can utilize an adaptive signal processing algorithm that enables switching between combined DMRS-SRS signals (e.g., as generated by the pilot concatenator 110) and the individual SRS or DMRS signals, e.g., as described in further detail below with respect to FIG. 6. In general, system 100 can address the needs of mMIMO networks in the mMTC era by providing a scalable, adaptable, and efficient solution to the pilot contamination problem, paving the way for more robust and high-capacity wireless communication systems.

With further reference to FIG. 1, the effective deployment and operation of mMTC within mMIMO network frameworks, as well as other network use cases, can present difficulties in terms of pilot contamination, underutilization of system dimensionality, as well as constraints on scalability and adaptability (e.g., to variance in network topologies, UE distributions, etc.). By utilizing an improved approach to pilot signal design, system 100 can provide multiple advantages that can improve the performance of communication networks, e.g., mMIMO networks for mMTC and/or other suitable networks. These advantages can include, but are not limited to, the following:

Joint orthonormal signal design: Implementations described herein can utilize methods for jointly designing pilot signals, such as DMRS and SRS, to form an orthonormal combined signal. By introducing another dimension for orthonormality, the number of UEs that can be admitted to the network can increase significantly, given that the gNB will be able to use the concatenated DMRS-SRS signal when estimating CSI on the UL. These benefits are described in further detail below with respect to FIG. 3.

Increased system dimensionality: By designing both DMRS and SRS such that their mutual concatenation is also mutually orthogonal, a significant increase in the number of orthonormal bases can be added to the overall bank of available orthonormal signaling. This enhanced dimensionality can allow for a greater number of UEs to be supported simultaneously, which is of particular benefit for the scalability demanded in mMTC scenarios.

Dynamic pilot signal adaptation: Implementations described herein can utilize an adaptive algorithm that dynamically adjusts the pilot signal structure based on real-time network topology and UE distribution. This can allow a gNB to use DMRS, SRS, or their concatenation during UL channel training, e.g., based on the availability of UL pilot signals. This adaptability can be of particular benefit for maintaining optimal performance in the highly variable and dense environments characteristic of mMTC applications.

Mitigation of pilot contamination: Implementations described herein can go beyond mere enhancement of pilot signal orthogonality, e.g., by facilitating joint pilot generation and adaptive allocation that directly addresses the pilot contamination problem. This can improve channel estimation accuracy and, as a result, overall network throughput and reliability.

Flexibility and scalability: Implementations described herein can be designed with a forward-thinking approach to accommodate future expansions in network size and/or complexity. The flexibility inherent in the joint signal design described herein can allow for easy integration into existing infrastructures and standards, while the scalability can ensure that the system can evolve with the continuously increasing demands of mMTC.

Resource optimization: Implementations described herein can optimize network performance by ensuring that the joint signal design described herein does not add to the pilot overhead. This optimization can facilitate improvements to spectrum efficiency and the effective operation of mMIMO systems.

By providing the above and/or other benefits, implementations described herein can provide dynamic and scalable signal management that offers a practical solution that caters to the needs of the next generation of wireless communication networks.

Figure 2:
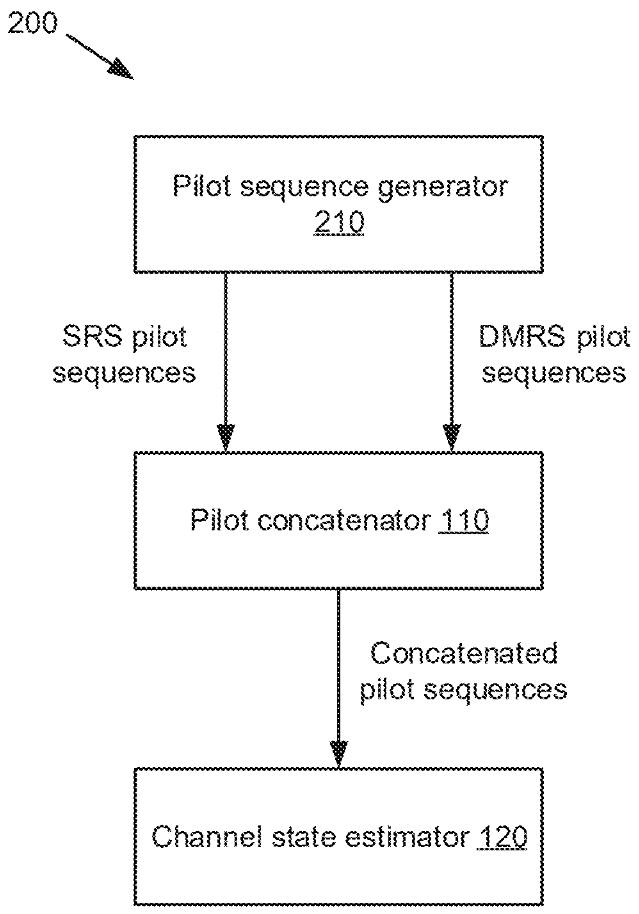

Turning now to FIG. 2, a block diagram of another system 200 that facilitates combined reference signal design for enhanced UL channel state estimation is illustrated. Repetitive description of like parts described above with regard to other implementations is omitted for brevity. System 200 as shown in FIG. 2 includes a pilot concatenator 110 and a channel state estimator 120 that can operate as described above with respect to FIG. 1. As further shown in FIG. 2, system 200 includes a pilot sequence generator 210 that can generate pilot sequences, e.g., the SRS pilot sequences and/or DMRS pilot sequences processed by the pilot concatenator 110 as described above.

In an implementation, the pilot sequence generator 210 can generate first vectors of mutually orthonormal SRS pilot sequences, e.g., using the Gram-Schmidt protocol and/or other suitable pilot generation techniques, such that the SRS vectors each have a first number of elements that is equal to the SRS pilot dimensionality supported by the network in which system 200 operates. Similarly, the pilot sequence generator 210 can generate second vectors of mutually orthonormal DMRS pilot sequences, e.g., using the Gram-Schmidt protocol and/or other suitable techniques, such that the DMRS vectors each have a second number of elements that is equal to the DMRS pilot dimensionality supported by the network. As used herein, "mutually orthonormal" refers to a vector or other set of signals that are structured such that the product of any signal multiplied by itself is equal to 1 and the product of any two different signals of the set is equal to 0.

Based on these pilot vectors, the pilot concatenator 110 can generate a concatenated vector of mutually orthonormal pilot sequences having a number of elements that is at least (e.g., no less than) the sum of the SRS and DMRS dimensionalities supported by the network. Stated another way, if the supported SRS dimensionality of the network is X and the supported DMRS dimensionality of the network is Y, the concatenated pilot vector generated by the pilot concatenator 110 can have at least X+Y elements. A technique that can be utilized by the pilot concatenator 110 for this purpose is described in further detail below with respect to FIG. 4.

Referring now to FIG. 3, and with further reference to FIG. 1, example operations that can be performed by the pilot concatenator 110 are illustrated via diagrams 300 and 302. Referring first to diagram 300, a pair of two-dimensional sets of sequences (denoted by $S_i$ and $S_j$) to be designed for physical uplink control channel (PUCCH) (DMRS) and UL special-slot (SRS), respectively, is shown. In this example, sets $S_i$ and $S_j$ are designed independently and the first intuitive orthonormal vectors for both are given as shown in diagram 300. Based on these sets, different concatenated combinations of $S_i$ and $S_j$ are given as $S_{Con.}$ as shown in diagram 300. For clarity of illustration, the unshaded elements of $S_{Con.}$ correspond to elements of $S_i$, and the shaded elements of $S_{Con.}$ correspond to elements of $S_j$. Given the resultant set of signals $S_{Con.}$ shown in diagram 300, there are at most two mutually orthogonal signal subsets. As a result, using the joint DMRS-SRS set shown in diagram 300 adds no additional system capacity (dimensionality) on UL CSI detection as opposed to using each set individually.

In contrast, diagram 302 illustrates an example in which $S_i$ and $S_j$ are designed independently and the first intuitive orthonormal vectors for both are given as shown are jointly designed. It is noted that even in this joint design, the signals of $S_i$ and $S_j$ are designed independently and the first intuitive orthonormal vectors for both are given as shown are still mutually orthonormal on themselves. As diagram 302 further illustrates, the concatenated combinations of the joint $S_i$-$S_j$ are designed independently and the first intuitive orthonormal vectors for both are given as shown signal design is given by $S_{Con.}$, where components of $S_{Con.}$ corresponding to $S_i$ are unshaded and components of $S_{Con.}$ corresponding to $S_j$ are shaded in a similar manner to diagram 300. Given this set of concatenated DMRS-SRS symbols, up to four orthogonal bases can be obtained for use in UL CSI estimation, as shown by $G_{orth}$.

As a result of the joint signal design shown in diagram 302, the capacity of an underlying system can be doubled, e.g., in terms of the number of available orthogonal sequences for UL CSI estimation and training. It is noted, however, that the two-dimensional signals shown in FIG. 3 are merely for purposes of illustration, and the gain achieved by conducting the technique shown in diagram 302 can increase significantly as the dimensionality of the individual sequences (e.g., $S_i$ and $S_j$) increases. For instance, in a system in which the DMRS dimensionality is approximately 100 and the SRS dimensionality is approximately 150, a jointly designed SRS-DMRS can have a dimensionality of at least approximately 100+150=250. Additionally, it is noted that while adopting combined DMRS-SRS CSI estimation, the individual design constraints of both SRS and DMRS can be maintained separately.

Figure 4:
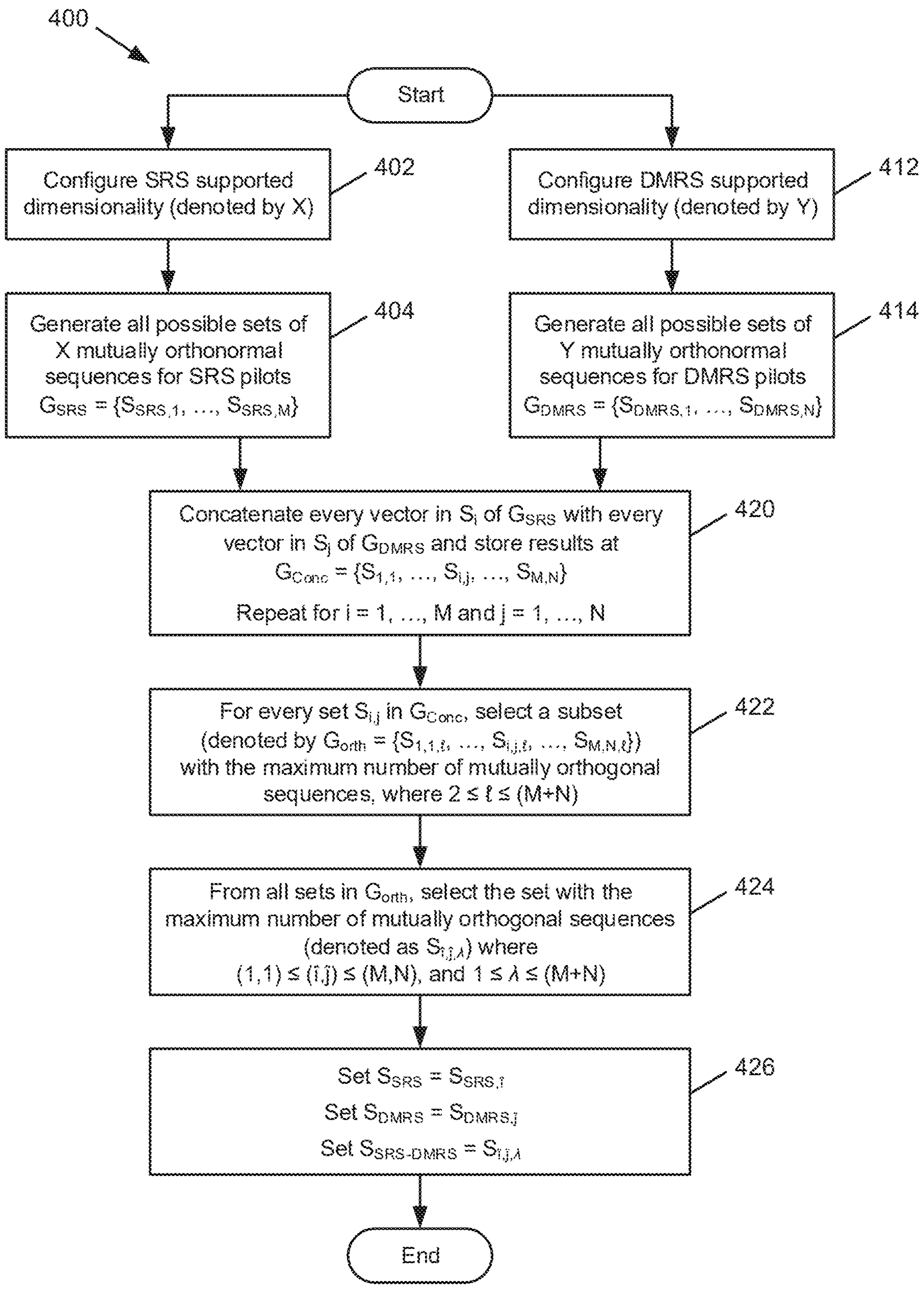
FIG. 4 is a flow diagram of a method that facilitates combined reference signal design for enhanced uplink channel state estimation in accordance with various implementations described herein.

Turning now to FIG. 4, a flow diagram of a method 400 that facilitates combined reference signal design for enhanced uplink channel state estimation is illustrated. Method 400 can begin by generating SRS pilots, e.g., as shown at 402 and 404, and generating DMRS pilots, e.g., as shown at 412 and 414. It is noted that the operations shown at 402 and 404 could occur in parallel with the operations shown at 412 and 414 and/or at different times.

With more specific reference to the pilot generation steps of method 400, at 402, the SRS dimensionality supported by the network in which method 400 operates, denoted in FIG. 4 as X, is configured. Next, at 404, all possible sets of X mutually orthonormal sequences for SRS pilots can be generated, e.g., as a group $G_{SRS}$ of sets $S_{SRS,1 \ldots M}$ as shown in FIG. 4. Similarly, at 412, the DMRS dimensionality supported by the network in which method 400 operates, denoted in FIG. 4 as Y, is configured. Next, at 414, all possible sets of Y mutually orthonormal sequences for DMRS pilots can be generated, e.g., as a group $G_{DMRS}$ of sets $S_{DMRS,1 \ldots N}$ as shown in FIG. 4. In an implementation, the sets of pilot sequences generated at 404 and/or 414 can be generated using the Gram-Schmidt protocol and/or other suitable techniques.

Following generation of the SRS and DMRS sequences, method 400 can proceed to 420, at which each vector $S_i$ in $G_{SRS}$ (as generated at 404), where i=1, . . . , M, can be concatenated with each vector $S_j$ in $G_{DMRS}$ (as generated at 414), where j=1, . . . . N, resulting in a group of concatenated vectors $G_{Conc}$.

Next, at 422, for each set $S_{i,j}$ in $G_{Conc}$ as generated at 420, a subset of the sets of $G_{Conc}$ having a maximum number of mutually orthogonal sequences is selected. This subset is denoted here by $G_{orth}=\{S_{1,1,l}, \ldots, S_{i,j,l}, \ldots, S_{M,N,l}\}$, where $2 \le l \le M+N$.

At 424, from the sets of $G_{orth}$ as generated at 422, one set is selected according to one or more criteria, e.g., the set that introduces the highest orthonormality among the elements of the set, the set that has a smallest amount of combined signal energy or otherwise has a combined signal energy of respective pilot sequences that is less than a threshold amount of signal energy, and/or other suitable criteria. As shown in FIG. 4, this selected set can be denoted as $S_{\hat{i},\hat{j},\lambda}$, where $(1,1) \le (\hat{i},\hat{j}) \le (M,N)$, and $1 \le \lambda \le (M+N)$.

Following 424, method 400 can conclude at 426, in which the sets of SRS, DMRS, and concatenated SRS-DMRS pilots to be utilized by an underlying network device can be assigned according to the set selected at 424.

Figure 5:
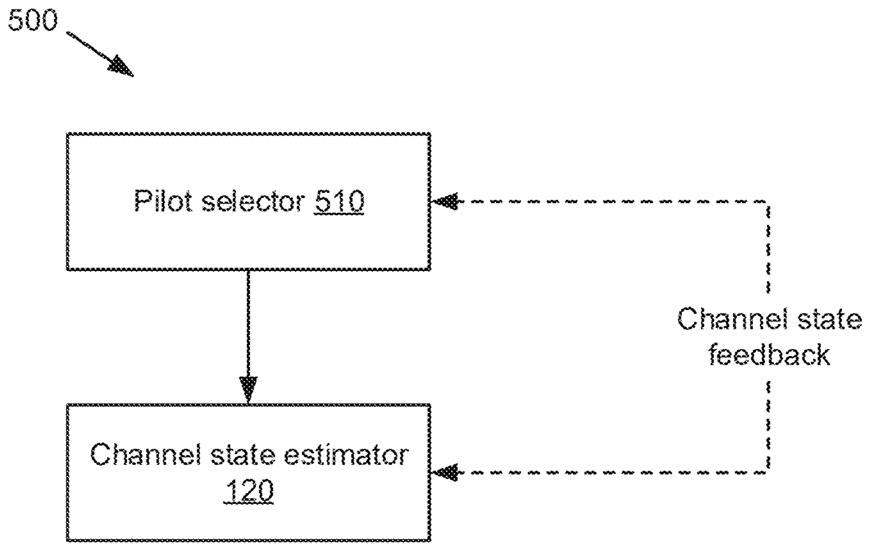
FIG. 5 is a block diagram of another system that facilitates combined reference signal design for enhanced uplink channel state estimation in accordance with various implementations described herein.

Referring now to FIG. 5, a block diagram of another system 500 that facilitates combined reference signal design for enhanced uplink channel state estimation is illustrated. Repetitive description of like parts described above with regard to other implementations is omitted for brevity. System 500 as shown in FIG. 5 includes a pilot selector 510, which can determine the availability of different types of pilot signals, e.g., SRS pilot signals and DMRS pilot signals, for UL CSI estimation. Based on this pilot signal availability, the pilot selector 510 can select a set (vector) of pilot sequences, e.g., a SRS vector, a DMRS vector, or a concatenated SRS-DMRS vector, that can subsequently be utilized by the channel state estimator 120 in estimating UL channel state. In this way, the pilot selector 510 can facilitate dynamic adaptation of pilot signals utilized by the channel state estimator 120 for UL channel estimation based on pilot availability.

Figure 6:
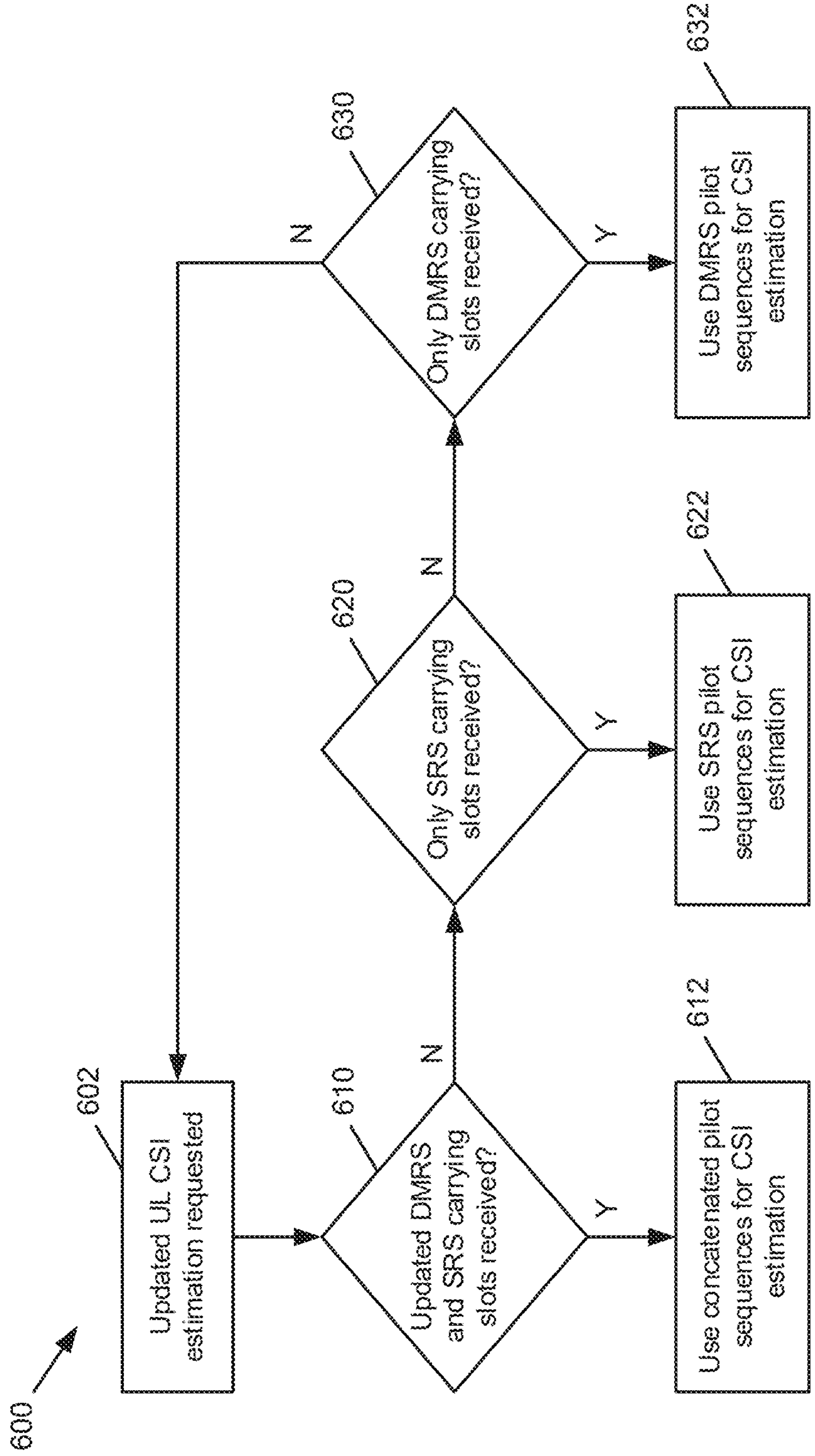
FIG. 6 is a flow diagram of another method that facilitates combined reference signal design for enhanced uplink channel state estimation in accordance with various implementations described herein.

Turning next to FIG. 6, a flow diagram of another method 600 that facilitates combined reference signal design for enhanced uplink channel state estimation is illustrated. In an implementation, method 600 can be triggered, e.g., by a pilot selector 510 as described above with respect to FIG. 5, each time an UL CSI is to be estimated. Method 600 begins at 602, at which an updated UL CSI estimation is requested. Subsequently, method 600 can, via the remaining operations shown in FIG. 6, conduct dynamic pilot adaptation to facilitate adjustment of CSI estimation based on pilot availability.

Dynamic pilot signal adaptation as performed via method 600 can begin at 610, at which it is determined (e.g., by a pilot selector 510) whether updated DMRS- and SRS-carrying slots have been received. If both DMRS-carrying slots and SRS-carrying slots have been received, or both DMRS and SRS pilot signals are otherwise available, method 600 can conclude at 612, in which concatenated DMRS-SRS pilot sequences are used for CSI estimation, e.g., as described above.

If, alternatively, SRS pilot signals and DMRS pilot signals are not both available, method 600 can proceed to 620, in which it is determined whether SRS pilot signals are available (and DMRS signals are not available), e.g., based on only SRS-carrying slots being received. If the SRS pilot signals are available, method 600 can conclude at 622, in which SRS pilot sequences are used for CSI estimation.

In the event that SRS pilot signals are determined not to be available at 620, method 600 can proceed from 620 to 630, in which it is determined whether DMRS pilot signals are available (and SRS signals are not available), e.g., based on only DMRS-carrying slots being received. If the DMRS pilot signals are available, method 600 can conclude at 632, in which DMRS pilot sequences are used for CSI estimation. If, instead, it is determined at 630 that DMRS pilot signals are also not available, it can be determined that no pilot signals for UL CSI estimation are currently available, and method 600 can return to 602 to re-request updated UL CSI estimation.

Method 600 as shown in FIG. 6 illustrates operations that can be performed by a gNB to perform UL CSI estimation based on a pilot signal received from a UE. At the UE side, an orthonormal pilot signal can be selected from the pool of available pilot signals (e.g., as generated by the pilot concatenator 110 as described above with respect to FIG. 1) and transmitted to the gNB. Upon receipt at the gNB, the gNB can then multiply the signal received from the UE by the pilot signal selected by the UE, which results in a product of 1×the channel gain, thereby enabling the gNB to determine the channel gain between the gNB and UE with high accuracy. However, if multiple UEs attempt to use the same orthogonal basis for their respective pilot signals, multiplication performed at the gNB will yield the channel impact caused by each of the UEs collectively. This introduces noise and reduces accuracy associated with attempting to determine the channel quality associated with an individual UE. By utilizing concatenated pilot signals as described herein, the number of orthonormal bases available to the UEs can be increased, thereby reducing this noise and increasing channel estimation accuracy.

By utilizing a joint pilot signal design as described herein, the total dimensionality available for pilot signals can be increased by a ratio of R=P|Q, where P is the original pilot dimensionality and Q is the extended pilot dimensionality after joint generation. By expanding the pilot dimensionality in this manner, various benefits can be achieved. These benefits can include, but are not limited to, the following:

Improved channel estimation: Accurate channel estimation is desirable for the overall performance of mMIMO and/or other systems. By expanding the pilot space, the granularity of CSI can be increased, which enhances signal quality and reduces error rates.

Increased UE capacity: The joint signal design described herein enables the network to support R times more UEs without increasing pilot contamination. This is of particular desirability in mMTC environments where the number of connected devices is rapidly growing. Mathematically, the network can support RK UEs with the expanded pilot space, compared to K UEs with the original dimensionality, without sacrificing performance.

Enhanced network throughput: An increase in dimensionality can also result in better utilization of the spatial multiplexing capabilities of mMIMO, thereby enhancing network throughput. For instance, the potential throughput increase can be modeled as $T_{new}=T_{old}\times R$, where $T_{new}$ is the new throughput and $T_{old}$ is the original throughput before the dimensionality expansion.

In order to integrate the implementations described herein within the RAN, various system and technology considerations can be taken into account. A non-exhaustive listing of such considerations is provided below.

System Architecture

Base station hardware: A base station (BS) can be equipped with mMIMO capabilities, supporting a large number of antennas (represented by M) to exploit beamforming and spatial multiplexing advantages. The hardware can be capable of performing signal processing computations with low latency and high throughput.

Antenna array configuration: The antenna arrays at the base stations can be designed to support the increased pilot signal dimensionality (Q), providing the spatial diversity associated with the joint pilot signal processing.

User equipment: UEs can be compatible with the advanced pilot signaling scheme described herein. This could be achieved, e.g., via updates to the firmware or hardware to process the joint orthonormal pilot signals for channel estimation.

Reference signal generation unit: A dedicated unit within the BS can be responsible for creating the joint orthonormal pilot signals using algorithms such as singular value decomposition (SVD) or Gram-Schmidt orthogonalization. This unit can be optimized for high-speed matrix operations to minimize latency.

Dynamic pilot signal adapter: This can be a software module within the BS that monitors network conditions and dynamically adapts the pilot signals. It can integrate with the existing management systems of the RAN to access real-time data for decision-making.

Centralized RAN controller: A centralized RAN controller can be used for coordination among multiple base stations. It can oversee the distribution of joint pilot signals and ensure consistency across the network, which is desirable for minimizing inter-cell interference.

Technologies and Protocols

Fifth generation (5G) new radio (NR) protocols: Implementations described herein can comply with 5G NR standards, such as those related to reference signal design for physical channels and modulation.

Software-defined networking (SDN): SDN can be used within the RAN to dynamically manage and orchestrate network resources, allowing for real-time adaptation of pilot signals and network parameters based on current requirements.

Network Function Virtualization (NFV): NFV can be leveraged to virtualize many of the network functions used for the dynamic adaptation of pilot signals, providing scalability and flexibility in resource allocation.

Artificial Intelligence/Machine Learning (AI/ML): AI/ML algorithms can process network data and predict optimal pilot signal configurations to minimize contamination and maximize throughput.

Cloud RAN (C-RAN): A C-RAN architecture can allow for centralized processing, which can be beneficial for the centralized RAN controller to perform computationally intensive tasks involved in generating and adapting pilot signals.

To further illustrate the advantages of implementations provided herein, FIGS. 7-10 illustrate the results of a simulation constructed to evaluate the performance of an adaptive pilot signal mechanism in an example mMIMO RAN environment. Parameters used in this evaluation are provided in Table 1 below.

TABLE 1

System parameters for simulated performance evaluation.

| Parameter | Value | Description |
|---|---|---|
| $N_r$ | 64 | Number of Rx antennas at gNB |
| $N_t$ | 16 | Number of UE Tx Antennas |
| U | 1 | Number of UEs |
| Pilot Length | $2^{N_t}$ | Pilot signal length for combined DMRS-SRS, DMRS and SRS. |

TABLE 1-continued

System parameters for simulated performance evaluation.

| Parameter | Value | Description |
|---|---|---|
| | | Depends on number of transmit antennas. |
| SNR | [0, 2, 4, . . . , 30] | Vector of SNR values in dB to simulate over |
| Bandwidth | 20 MHz | System bandwidth assumed for throughput calculation |

The results shown in FIGS. 7-10 are presented in two sections, relating to increased UE dimensionality (FIGS. 7-8) and enhanced UL throughput (FIGS. 9-10), respectively.

Increased UE Dimensionality

This section focuses on the ability of implementations described herein to increase the number of UEs a given gNB can accommodate, or the number of antennas, in terms of channel training and pilot assignments. For instance, with reference to FIG. 7, the maximum number of orthogonal sequences that can be generated for varying lengths of binary sequences X and Y are calculated. These binary sequences are concatenated to form a longer sequence [X Y], which is used to simulate the allocation of unique pilot signals to UEs in a communication system.

Figure 7:
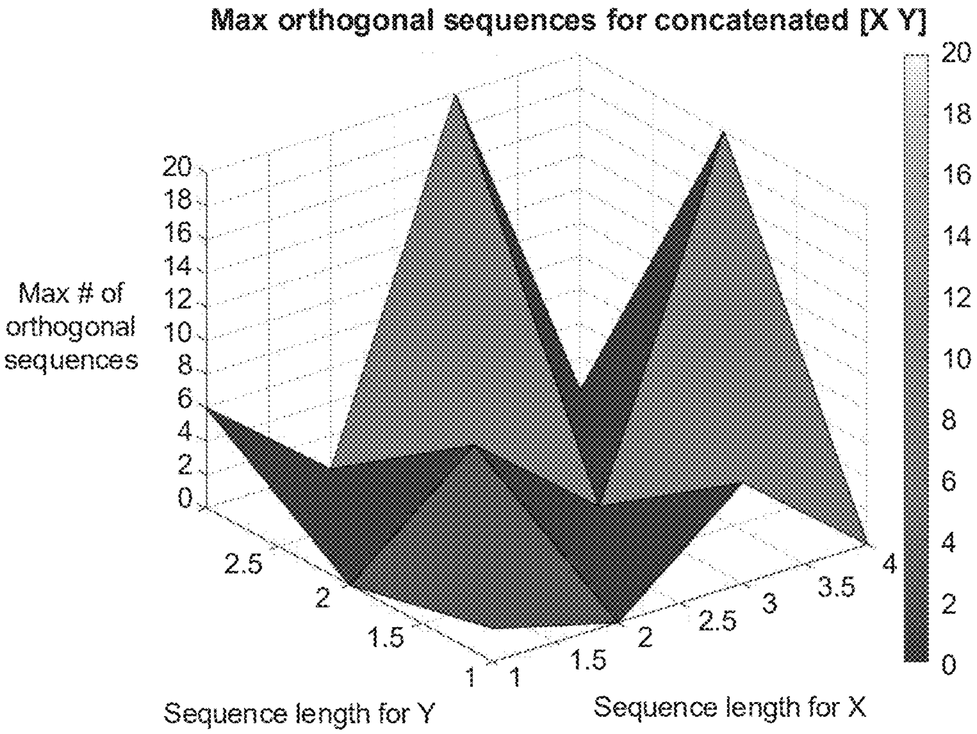
FIGS. 7-10 are diagrams illustrating example network performance improvements that can be realized via various implementations as described herein.

In FIG. 7, the results for individual sequences X and Y are plotted as the maximum number of orthogonal sequences against the sequence lengths. The maximum number of orthogonal sequences is determined by the sequence length, with longer sequences allowing a greater number of orthogonal signals.

For the concatenated sequences [X Y], the three-dimensional surface plot in FIG. 7 shows the relationship between the lengths of the X and Y sequences and the maximum number of orthogonal sequences that can be generated. This plot provides a visual representation of how the combination of X and Y sequence lengths can affect the number of unique pilot signals.

Figure 8:
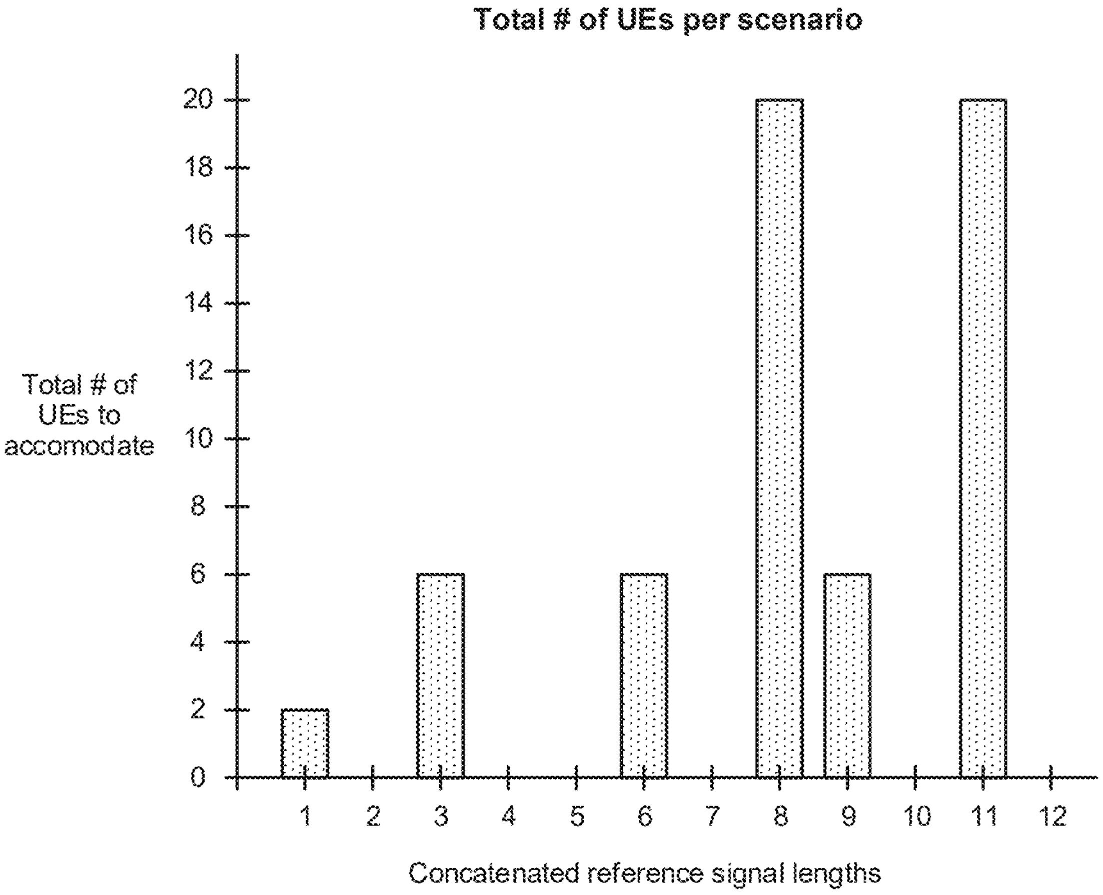

Turning next to FIG. 8, a bar plot is provided that represents the total number of UEs that can be assigned unique pilot signals for different combinations of sequence lengths of X and Y. Each bar corresponds to a specific scenario indexed by different combinations of sequence lengths.

The results shown in FIGS. 7-8 indicate that as the length of either sequence (e.g., DMRS or SRS) increases, the number of orthogonal sequences also increases, e.g., due to the exponential growth in the number of possible permutations with sequence length. This increase means more unique pilot signals are available for the UEs.

The surface plot for concatenated sequences [X Y] in FIG. 7 demonstrates that the number of unique pilot sequences available for UEs increases with longer sequence lengths for both X and Y. This is because the concatenation of two sequences results in a combined sequence with a length equal to the sum of the individual lengths, thus exponentially increasing the number of unique sequences.

The bar plot in FIG. 8 encapsulates the practical application of the analysis, showing how many UEs can be supported under each scenario. This plot is particularly useful for network designers, as it directly relates to how many UEs can be uniquely identified in a given resource block of a communication system.

Enhanced UL Throughput

Figure 9:
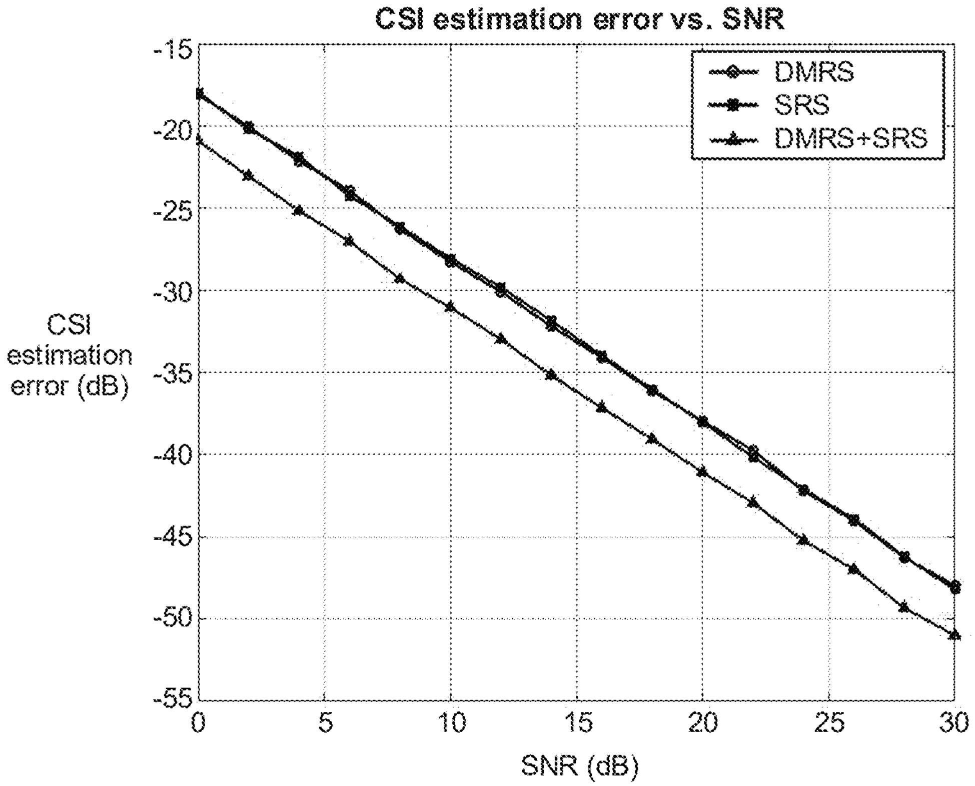

This part of the simulation demonstrates the effectiveness of implementations described herein in using concatenated pilot signals at the gNB to estimate the UL CSI of a UE. As shown in FIG. 9, combining DMRS and SRS leads to improved channel estimation quality compared to using the pilots individually, with CSI estimation error reduced by over 10 dB across signal-to-noise ratio (SNR) values. This validates that the orthogonality of the combined pilot structure mitigates pilot contamination effects.

Figure 10:
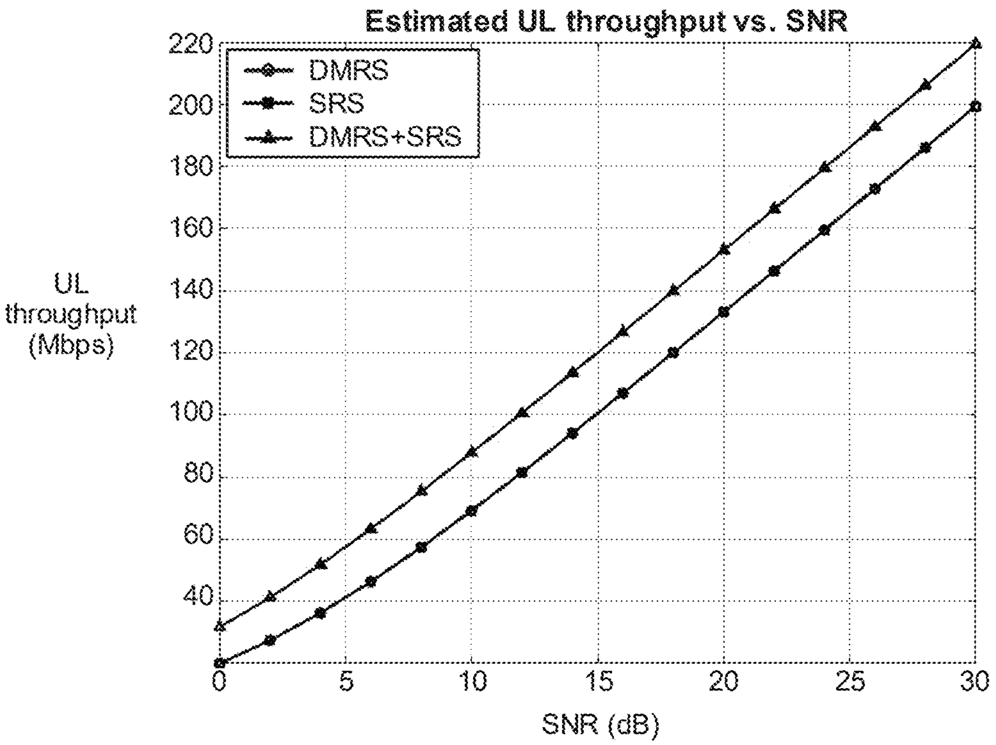

Correspondingly, FIG. 10 indicates a substantial gain in estimated uplink throughput from combining the pilots. At high SNRs, the combined approach nearly doubles the throughput compared to using DMRS or SRS alone. This underscores the efficacy of enhancing channel estimation accuracy through joint pilot design.

Figure 11:
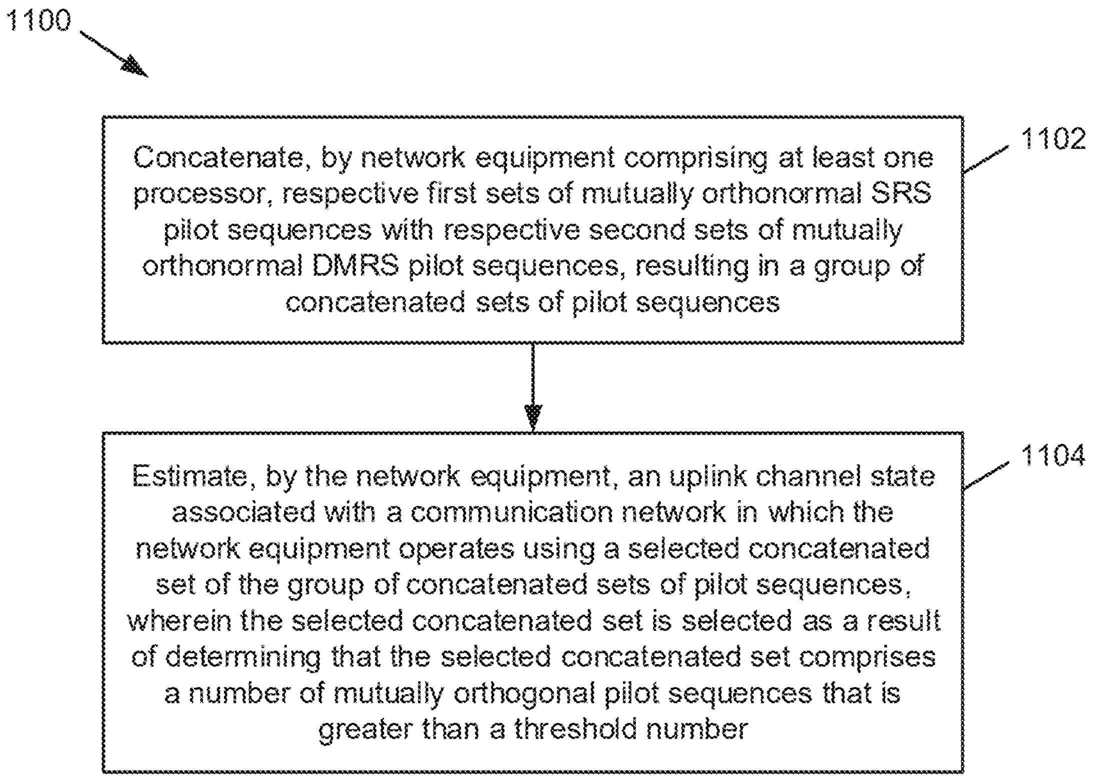
FIGS. 11-12 are flow diagrams of respective additional methods that facilitate combined reference signal design for enhanced uplink channel state estimation in accordance with various implementations described herein.

Turning to FIG. 11, a flow diagram of a method 1100 that facilitates combined reference signal design for enhanced uplink channel state estimation is illustrated. At 1102, network equipment comprising at least one processor (e.g., a processor 104) can concatenate (e.g., by a pilot concatenator 110) respective first sets of mutually orthonormal SRS pilot sequences with respective second sets of mutually orthonormal DMRS pilot sequences, resulting in a group of concatenated sets of pilot sequences.

At 1104, the network equipment can estimate (e.g., by a channel state estimator 120) an uplink channel state associated with a communication network in which the network equipment operates using a selected concatenated set of the group of concatenated sets of pilot sequences generated at 1102. The selected concatenated set can be selected at 1104 as a result of determining that the selected concatenated set comprises a number of mutually orthogonal pilot sequences that is greater than a threshold number.

Figure 12:
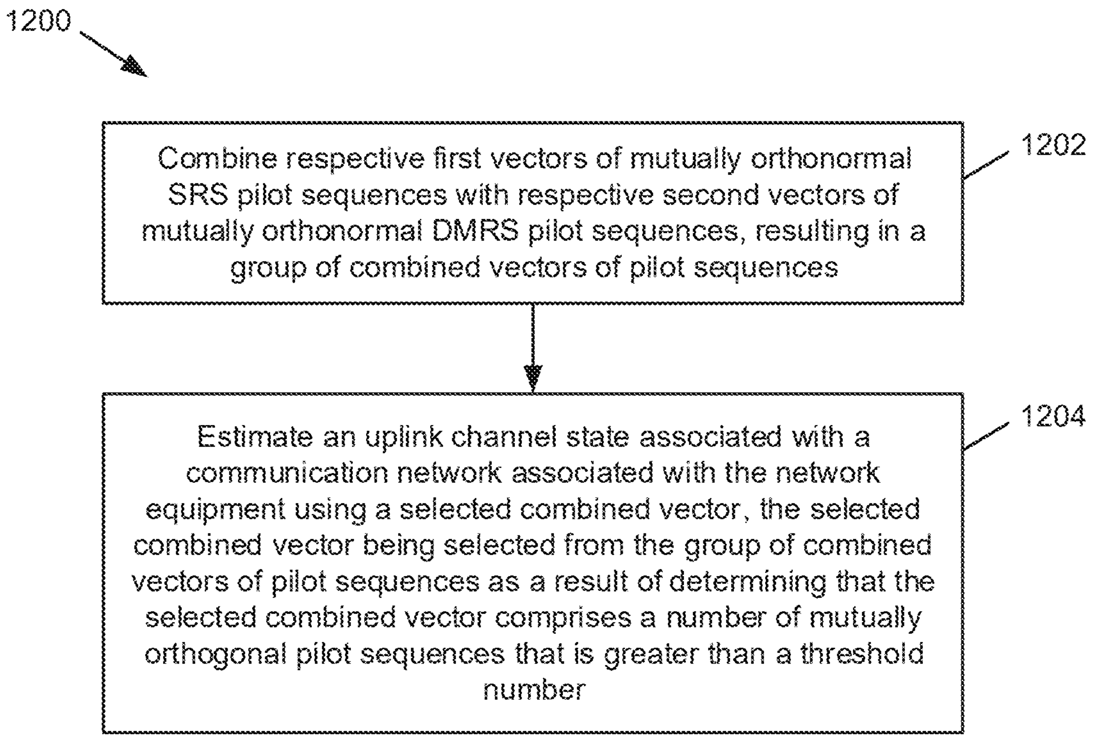

Referring next to FIG. 12, a flow diagram of a method 1200 that can be performed by at least one processor, e.g., based on machine-executable instructions stored on a non-transitory machine-readable medium, is illustrated. An example of a computer architecture, including a processor and non-transitory media, that can be utilized to implement method 1200 is described below with respect to FIG. 13.

Method 1200 can begin at 1202, in which the at least one processor can combine respective first vectors of mutually orthonormal SRS pilot sequences with respective second vectors of mutually orthonormal DMRS pilot sequences, resulting in a group of combined vectors of pilot sequences.

At 1204, the at least one processor can estimate an uplink channel state associated with a communication network associated with the network equipment using a selected combined vector. The selected combined vector can be selected by the at least one processor from the group of combined vectors of pilot sequences as a result of determining that the selected combined vector comprises a number of mutually orthogonal pilot sequences that is greater than a threshold number.

FIGS. 4, 6, and 11-12 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 13:
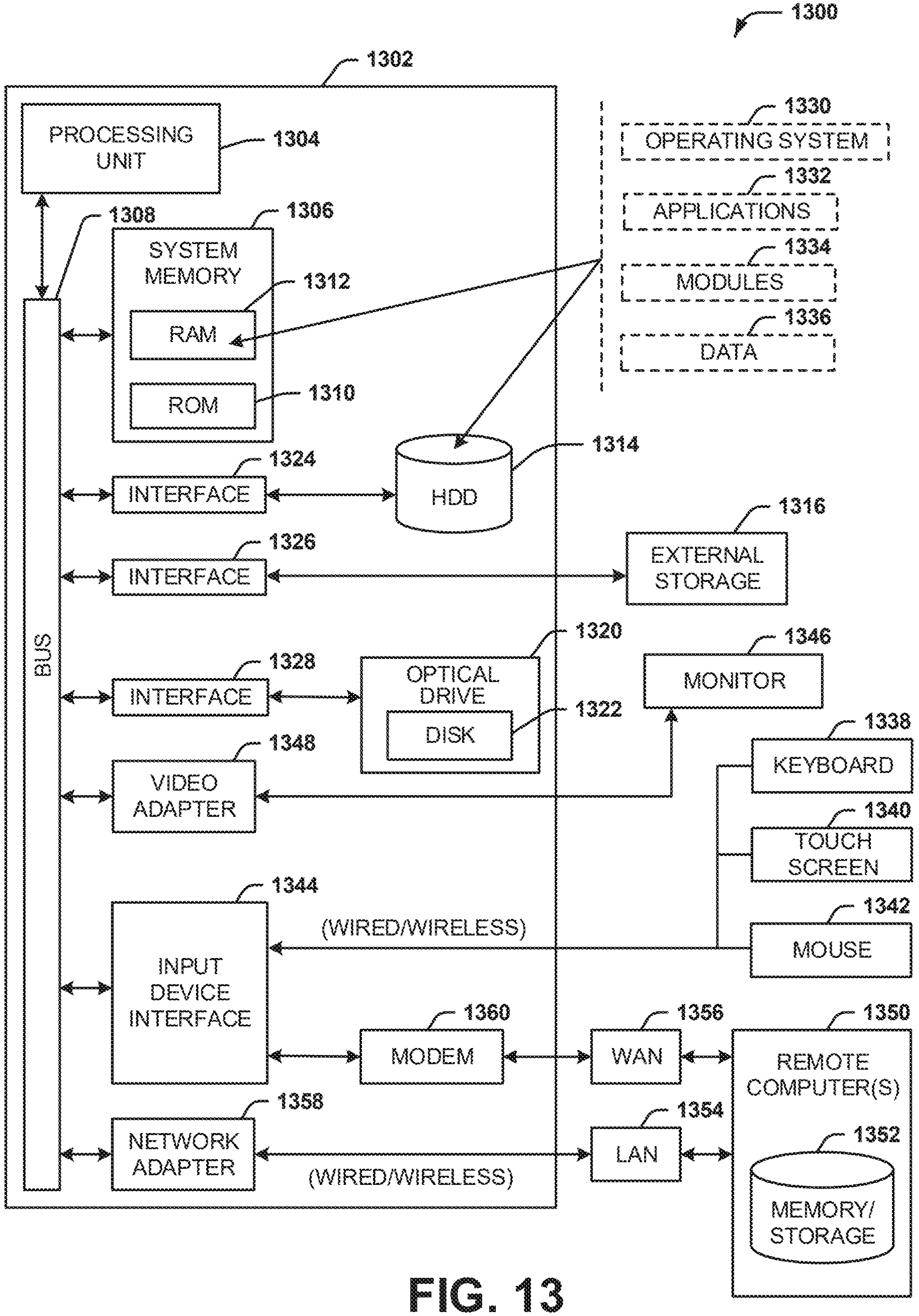
FIG. 13 is a diagram of an example computing environment in which various implementations described herein can function.

In order to provide additional context for various embodiments described herein, FIG. 13 and the following discussion are intended to provide a brief, general description of a suitable computing environment 1300 in which the various embodiments of the embodiment described herein can be implemented. While implementations have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference now to FIG. 13, an example general-purpose environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD), a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
at least one processor; and
at least one memory that stores executable instructions that, when executed by the at least one processor, facilitate performance of operations, the operations comprising:
concatenating respective first vectors of mutually orthonormal sounding reference signal (SRS) pilot sequences with respective second vectors of mutually orthonormal demodulation reference signal (DMRS) pilot sequences, resulting in a group of concatenated vectors of pilot sequences; and
estimating an uplink channel state associated with a communication network in which the system operates using a selected concatenated vector of the group of concatenated vectors of pilot sequences, the selected concatenated vector being selected as a result of determining that the selected concatenated vector comprises a number of mutually orthogonal pilot sequences that is greater than a threshold number.

2. The system of claim 1, wherein the operations further comprise:
generating the respective first vectors of the mutually orthonormal SRS pilot sequences, the first vectors each having a first number of elements that is equal to a first dimensionality of the SRS pilot sequences supported by the communication network; and
generating the respective second vectors of the mutually orthonormal DMRS pilot sequences, the second vectors each having a second number of elements that is equal to a second dimensionality of the DMRS pilot sequences supported by the communication network.

3. The system of claim 2, wherein the threshold number is no less than a sum of the first number of elements and the second number of elements.

4. The system of claim 1, wherein the threshold number is a maximum number of mutually orthogonal pilot sequences present in a concatenated vector of the group of concatenated vectors.

5. The system of claim 1, wherein the operations further comprise:
selecting the selected concatenated vector based on a combined signal energy of respective pilot sequences of the selected concatenated vector being less than a threshold amount of signal energy.

6. The system of claim 1, wherein the uplink channel state is a first uplink channel state, and wherein the operations further comprise:
determining availability of SRS pilot signals and DMRS pilot signals for estimation of a second uplink channel state; and
estimating the second uplink channel state based on a selected vector of pilot sequences, selected from a group consisting of a selected first vector of the first vectors of mutually orthonormal SRS pilot sequences, a selected second vector of the second vectors of mutually orthonormal DMRS pilot sequences, and the selected concatenated vector, the selected vector of pilot sequences being selected based on the availability of the SRS pilot signals and DMRS pilot signals.

7. The system of claim 6, wherein the operations further comprise:

selecting the selected concatenated vector as the selected vector of pilot sequences in response to determining that the SRS pilot signals and the DMRS pilot signals are both available for estimation of the second uplink channel state.

8. The system of claim 6, wherein the operations further comprise:

selecting the selected first vector as the selected vector of pilot sequences in response to determining that the DMRS pilot signals are not available for estimation of the second uplink channel state; and selecting the selected second vector as the selected vector of pilot sequences in response to determining that the SRS pilot signals are not available for estimation of the second uplink channel state.

9. A method, comprising:

concatenating, by network equipment comprising at least one processor, respective first sets of mutually orthonormal sounding reference signal (SRS) pilot sequences with respective second sets of mutually orthonormal demodulation reference signal (DMRS) pilot sequences, resulting in a group of concatenated sets of pilot sequences; and estimating, by the network equipment, an uplink channel state associated with a communication network in which the network equipment operates using a selected concatenated set of the group of concatenated sets of pilot sequences, wherein the selected concatenated set is selected as a result of determining that the selected concatenated set comprises a number of mutually orthogonal pilot sequences that is greater than a threshold number.

10. The method of claim 9, further comprising:

generating, by the network equipment, the respective first sets of the mutually orthonormal SRS pilot sequences as respective sets of X SRS pilot sequences, wherein X is equal to a first dimensionality of the SRS pilot sequences supported by the communication network; and generating, by the network equipment, the respective second sets of the mutually orthonormal DMRS pilot sequences as respective sets of Y DMRS pilot sequences, wherein Y is equal to a second dimensionality of the DMRS pilot sequences supported by the communication network.

11. The method of claim 10, wherein the threshold number is at least X+Y.

12. The method of claim 9, wherein the threshold number is a maximum number of mutually orthogonal pilot sequences present in a concatenated set of the group of concatenated sets of pilot sequences.

13. The method of claim 9, wherein the uplink channel state is a first uplink channel state, and wherein the method further comprises:

selecting, by the network equipment, a selected set of pilot sequences based on availability of SRS-carrying slots and DMRS-carrying slots for estimation of a second uplink channel state, the selected set of pilot sequences being selected from a group consisting of a first set of the first sets of mutually orthonormal SRS pilot sequences, a second set of the second sets of mutually orthonormal DMRS pilot sequences, and the selected concatenated set of the group of concatenated sets of pilot sequences; and estimating, by the network equipment, the second uplink channel state based on the selected set of pilot sequences.

14. The method of claim 13, wherein the selecting comprises selecting the selected concatenated set of the group of concatenated sets of pilot sequences as the selected set of pilot sequences in response to determining that the SRS-carrying slots and the DMRS-carrying slots are available.

15. The method of claim 13, wherein the selecting comprises:

selecting the first set as the selected set of pilot sequences in response to determining that the DMRS-carrying slots are not available; and selecting the second set as the selected set of pilot sequences in response to determining that the SRS-carrying slots are not available.

16. A non-transitory machine-readable medium comprising computer executable instructions that, when executed by at least one processor of network equipment, facilitate performance of operations, the operations comprising:

combining respective first vectors of mutually orthonormal sounding reference signal (SRS) pilot sequences with respective second vectors of mutually orthonormal demodulation reference signal (DMRS) pilot sequences, resulting in a group of combined vectors of pilot sequences; and estimating an uplink channel state associated with a communication network associated with the network equipment using a selected combined vector, the selected combined vector being selected from the group of combined vectors of pilot sequences as a result of determining that the selected combined vector comprises a number of mutually orthogonal pilot sequences that is greater than a threshold number.

17. The non-transitory machine-readable medium of claim 16, wherein the operations further comprise:

generating the respective first vectors of the mutually orthonormal SRS pilot sequences, each of the first vectors having a first number of elements that is equal to a first dimensionality of the SRS pilot sequences supported by the communication network; and generating the respective second vectors of the mutually orthonormal DMRS pilot sequences, each of the second vectors having a second number of elements that is equal to a second dimensionality of the DMRS pilot sequences supported by the communication network.

18. The non-transitory machine-readable medium of claim 16, wherein the uplink channel state is a first uplink channel state, and wherein the operations further comprise:

designating a selected vector of pilot sequences based on availability of SRS-carrying slots and DMRS-carrying slots for estimation of a second uplink channel state, the selected vector of pilot sequences being selected from a group consisting of a first vector of the first vectors of mutually orthonormal SRS pilot sequences, a second vector of the second vectors of mutually orthonormal DMRS pilot sequences, and the selected combined vector; and estimating the second uplink channel state using the selected vector of pilot sequences.

19. The non-transitory machine-readable medium of claim 18, wherein the designating comprises designating the selected combined vector as the selected vector of pilot sequences in response to determining that the SRS-carrying slots and the DMRS-carrying slots are available.

20. The non-transitory machine-readable medium of claim 18, wherein the designating comprises:

designating the first vector as the selected vector of pilot sequences in response to determining that the DMRS-carrying slots are not available; and designating the second vector as the selected vector of pilot sequences in response to determining that the SRS-carrying slots are not available.

* * * * *